Jan. 3, 1950     J. M. STIFF ET AL     2,493,170
AUTOMOBILE ACCESSORY
Filed Dec. 19, 1947     3 Sheets-Sheet 1
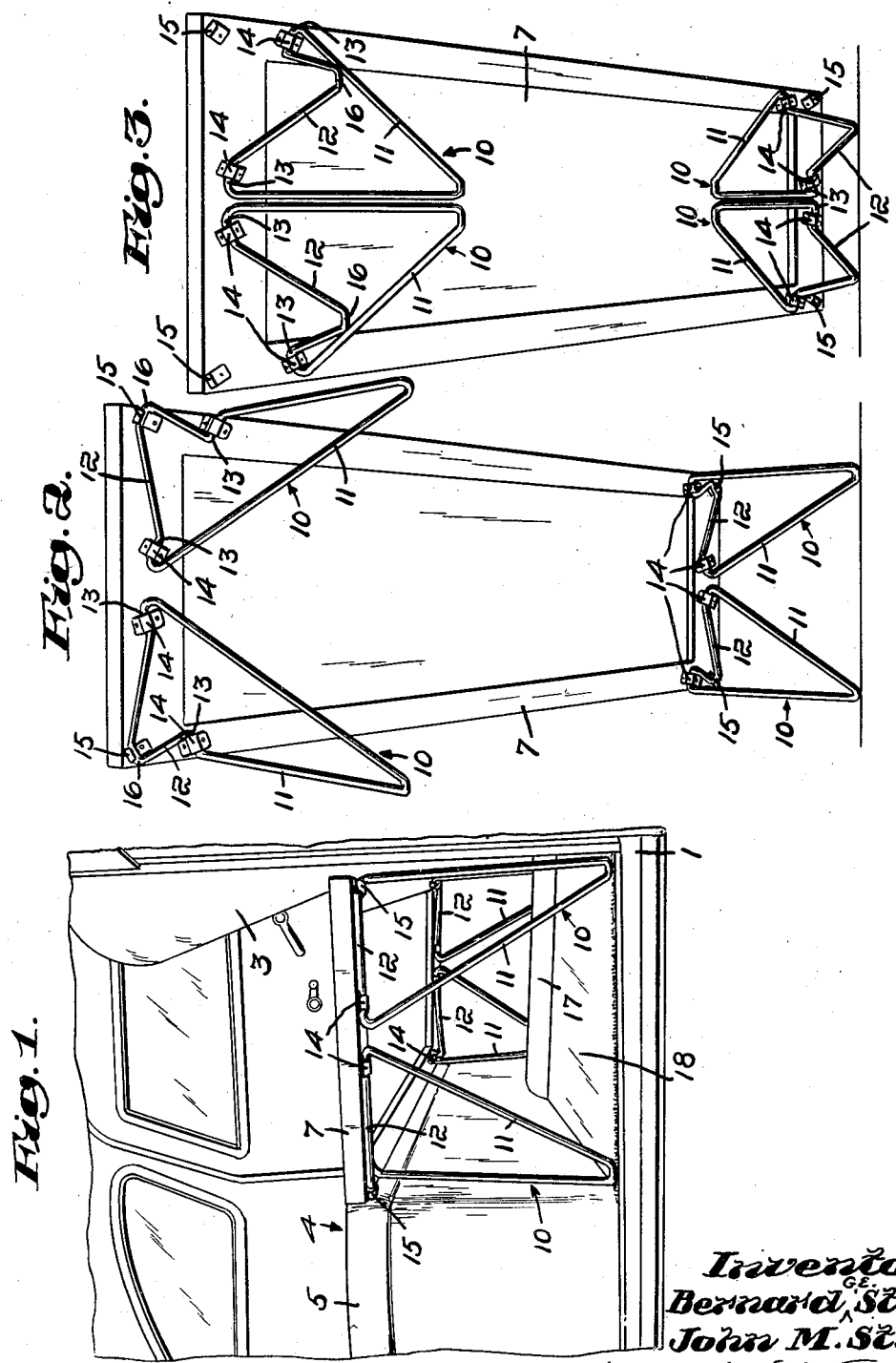

Jan. 3, 1950  J. M. STIFF ET AL  2,493,170
AUTOMOBILE ACCESSORY
Filed Dec. 19, 1947  3 Sheets-Sheet 2
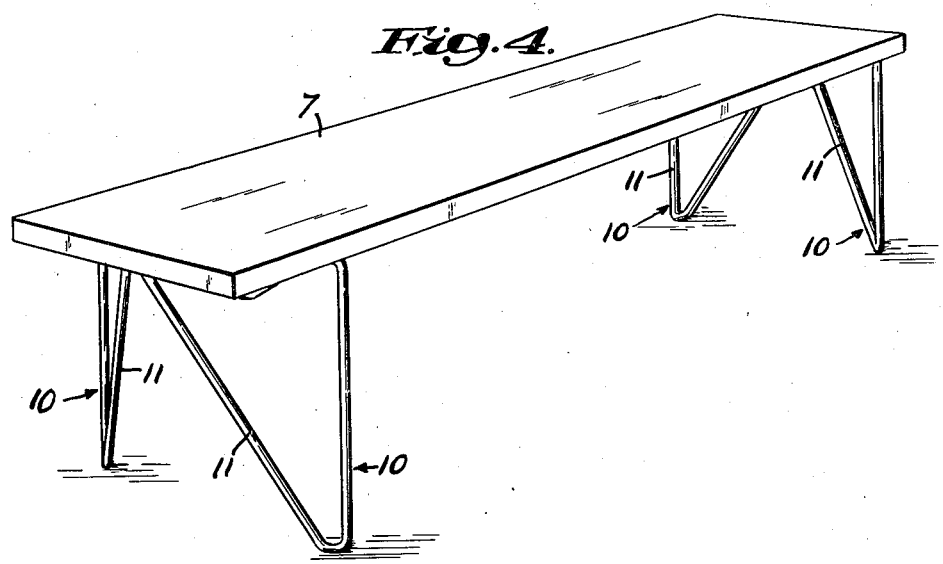
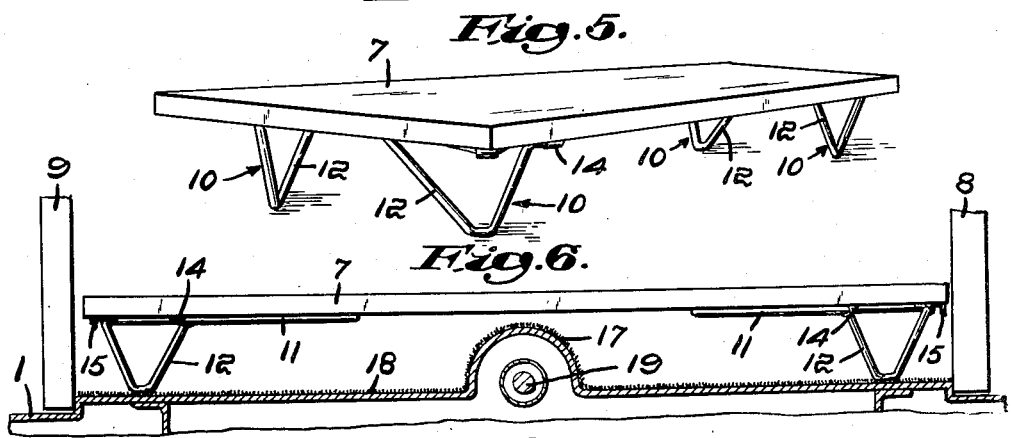
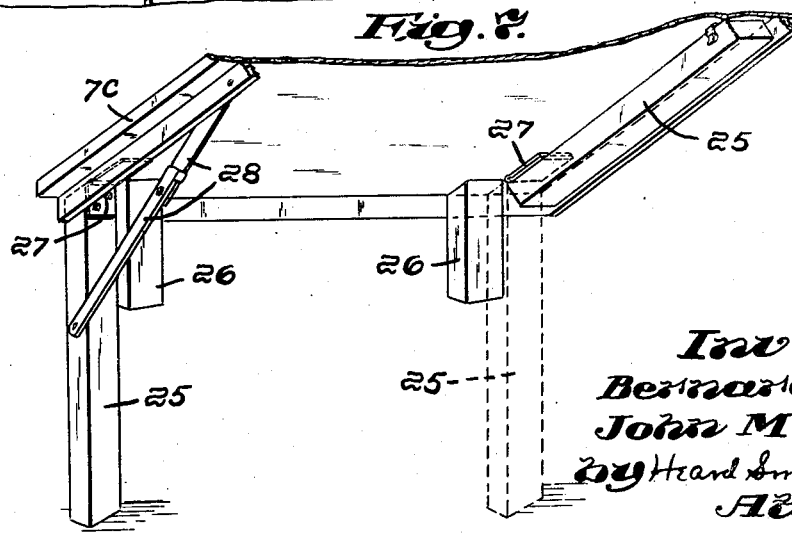

Jan. 3, 1950     J. M. STIFF ET AL     2,493,170
AUTOMOBILE ACCESSORY
Filed Dec. 19, 1947     3 Sheets-Sheet 3
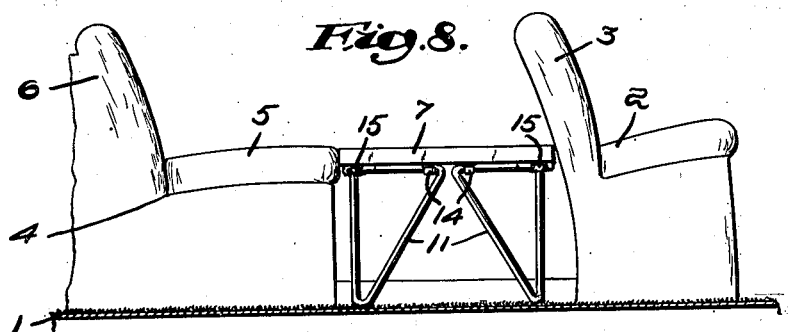
Fig. 8.
Fig. 9.
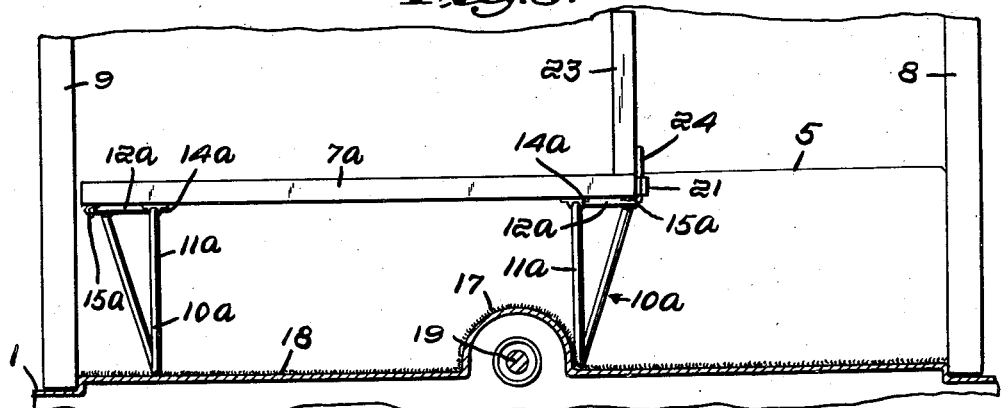
     
Fig. 10.     Fig. 11.
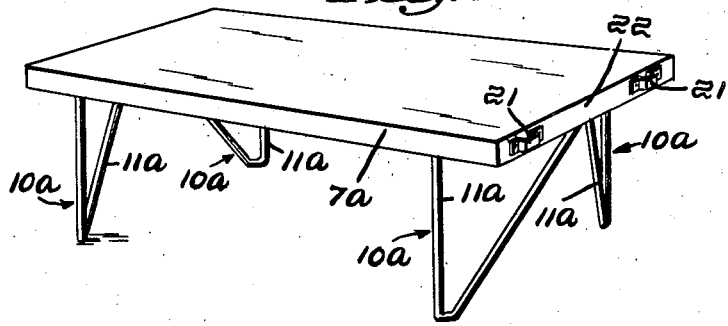     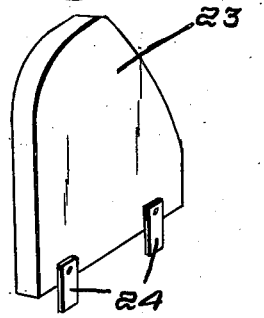
Fig. 12.
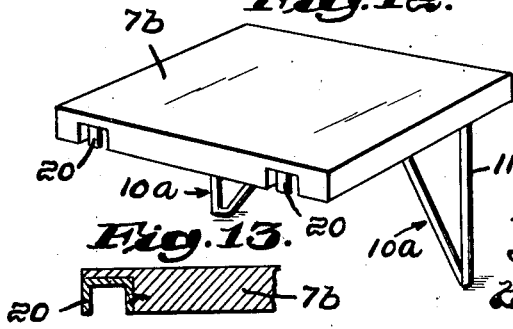
Inventors:
Bernard E. Stiff,
John M. Stiff,
By Heard Smith & Tennant
Attorneys
Fig. 13.

Patented Jan. 3, 1950

2,493,170

UNITED STATES PATENT OFFICE 2,493,170

AUTOMOBILE ACCESSORY

John M. Stiff, Arlington, and Bernard G. E. Stiff, Malden, Mass.

Application December 19, 1947, Serial No. 792,734

2 Claims. (Cl. 296—1)

This invention relates to an accessory for an automobile of the sedan type, and it has for its object to provide an accessory in the nature of a platform element which can be installed in a sedan type automobile between the back of the front seat and the front edge of the back seat cushion thereby to provide with the back seat cushion the floor of a play pen compartment in which one or more small children can be placed and safely transported without requiring any special attention from the occupants of the front seat.

In one form of the invention the platform element extends the full width of the automobile from one side to the other, in which case the backs of the front seat and back seat and the sides of the automobile constitute the side walls of the play pen compartment.

In another form of the invention the platform element is divided from front to rear to form two separable sections so that when the two sections are in use, the play pen compartment extends the full width of the car, while if one of the sections is removed, the size of the play pen compartment is correspondingly reduced, but provision is made for one person to occupy the end of the rear seat at that side of the automobile from which the platform section has been removed. In such case the person occupying the rear seat may, if he so desires, use the platform section remaining in the automobile as a rest for his feet, thereby providing him with a restful change of position during a long journey.

When only one section of the platform element is used, and the space in the rear of the front seat is to be occupied by a child, an end member may be applied to the inner end of the platform section in use to provide an end wall for the play pen compartment.

The compartment thus provided by our invention in the rear of the back seat of the automobile is large enough so that a small child, when placed therein, has ample room to move about freely and to occupy himself with his playthings. Moreover the back seat cushion constitutes an excellent bed on which a child may sleep comfortably during an automobile trip, and since the platform element is flush with said rear seat cushion, a sleeping child cannot fall off from the back seat.

Our invention, therefore, eliminates many of the discomforts usually encountered by both adults and small children when traveling by automobile. In case the compartment provided by the use of our platform element is not to be used as a play pen compartment, it forms a space in which luggage may be conveniently stored.

A further object of the invention is to provide an automobile accessory such as above described which is provided with supporting means by which it may be supported in the automobile either at a level in which the top surface thereof is substantially flush with the rear seat cushion, or at a low level between the front and back seats in which said platform element will just clear the portion of the floor of the automobile which is elevated to accommodate the drive shaft.

In order to give an understanding of our invention, we have illustrated in the drawings some selected embodiments thereof which will now be described, after which the novel features will be pointed out in the appended claims.

In the drawings,

Fig. 1 is a fragmentary perspective view showing our automobile accessory installed in an automobile.

Fig. 2 is an under side perspective view showing the supporting legs in position to support the platform element in the operative position shown in Fig. 1.

Fig. 3 is a similar view showing the folding legs folded and designed to support the platform element in the low position shown in Fig. 6.

Fig. 4 is a perspective view of the platform element showing the legs adjusted for supporting it in an operative position.

Fig. 5 is a perspective view showing the legs adjusted for supporting it in its inoperative or stored position within the automobile.

Fig. 6 is a fragmentary sectional view showing the platform element in its low-level stored position within the automobile.

Fig. 7 is a fragmentary perspective view illustrating a different embodiment of the invention.

Fig. 8 is a fragmentary view showing the platform element installed in an automobile and in its operative position.

Fig. 9 is a sectional view illustrating a platform element of the sectional type installed in an automobile.

Fig. 10 is a perspective view of the platform section shown in Fig. 9.

Fig. 11 is a perspective view of the detachable end member employed in the embodiment shown in Fig. 9.

Fig. 12 is a perspective view of the other section of the platform member which together with the section shown in Fig. 9 makes a complete platform extending the full width of the automobile.

Fig. 13 is a fragmentary sectional view illustrating one manner in which the two sections of the platform element are connected together.

In the drawings 1 indicates generally an automobile of the sedan type which is provided with the usual front seat 2 having a back 3 and the usual back seat 4 provided with a seat cushion 5 and a back 6.

As stated above our novel accessory is in the nature of a platform element 7 which can be installed in the automobile between the back 3 of the front seat 2 and the front edge of the back seat cushion 5, thereby to form with said back seat cushion the floor of a play pen compartment for a child, the front and rear walls of which compartment are constituted by the back 3 of the front seat and the back 6 of the rear seat, and the side walls of which compartment may be constituted by the sides 8, 9 of the automobile. In the case of a two-door sedan these sides 8 and 9 might be the side walls of the automobile, while in a four-door sedan the side walls would be formed by the rear doors of the automobile. The platform element 7 is provided with means for supporting it in its operative position flush with the top surface of the back seat cushion 3 as shown in Figs. 1 and 8, and in the embodiment shown in Figs. 1 to 6 such supporting means is in the form of legs pivotally secured to the under side of the platform element and constructed so that when the legs are in one position, they support the platform element in its operative position shown in Fig. 8, while when the legs are in another position, they support the platform in a lowered or stored position between the back and front seats of the automobile.

The leg elements shown in Figs. 1 to 6 are indicated generally at 10, and each leg is made with two sections, a long section 11 and a short section 12. Each leg may conveniently be made of wire bent to the shape shown in Figs. 2 and 3, and each leg presents the two bearing sections 13 which are in line with each other, and each of which is embraced by a bearing clip 14 that is secured to the under side of the platform element.

The bearing portions 13 thus constitute an axis about which each leg can be turned.

The legs are so formed that the long section 11 and short section 12 occupy planes at right angles to each other, and each leg is so pivotally connected to the platform section that it may be swung into position with the short section 12 lying flat against the under side of the platform element and the long section 11 depending at right angles to the platform section as shown in Figs. 1, 2 and 4, or the legs may be folded into a position in which the long sections 11 lie against the under side of the platform element and the short sections 12 extend at right angles thereto as shown in Figs. 3, 5 and 6.

The platform element is preferably provided with a spring clip 15 for each leg which is adapted to engage the portion 16 of the short leg section when the legs are swung to bring the long sections 11 into their operative position shown in Figs. 1, 2 and 4. These clips 15 will thus serve to hold the legs in such operative position, but because of their resilient nature they permit the legs to be readily swung into the folded position shown in Figs. 3 and 5.

When the legs are in their folded position with the long sections 11 lying against the bottom of the platform element and the short sections 12 extending at right angles therefrom, said platform element may be stored in the bottom of the automobile between the front and rear seats as shown in Fig. 6, and the short sections 12 of the legs are preferably so proportioned that when the platform element is supported thereon, it will just clear the longitudinally extending portion 17 of the floor 18 of the automobile which is raised to accommodate the drive shaft 19.

When the platform section is in its low-level position shown in Fig. 6, it may be used as a foot rest for the occupants of the back seat.

When the platform element is installed in the automobile in its raised operative position as shown in Figs. 1 and 8, the space in the rear of the back of the front seat will be converted into a play pen, the floor of which is constituted by the platform element 7 and the rear seat cushion 5, the front and back walls of which are constituted by the backs 3 and 6 of the front and back seats, and the side walls of which are constituted by the sides 8 and 9 of the automobile, whether these sides be part of the permanent side walls of the automobile or whether they be in the nature of the rear doors of a four-door sedan. If the doors of the sedan are properly locked and the rear windows are also properly closed, then one or more children can be placed in the play pen compartment thus provided and can be safely transported in the automobile without requiring any special attention from the occupants of the front seat. Inasmuch as the platform element 7, when in its operative position, is substantially flush with the rear seat cushion 5, the floor of the play pen compartment will be level and free from any obstructions so that a small child can move freely about in the compartment without injury. The said play pen compartment also provides an excellent bed on which a child may sleep comfortably and safely during an automobile trip.

Our improved platform element may be made as a one-piece unit as shown in Figs. 2, 3 and 4, or it may be divided transversely from front to rear to form two sections 7a and 7b as shown in Figs. 9, 10 and 12. When the platform element is thus divided, we prefer to make the division such that the platform section 7a will be longer than the other section 7b. The platform section 7a may be provided with four legs 10a as shown in Fig 10, said legs 10a being constructed similar to the legs above described.

The shorter section 7b may be provided with two legs 10a, and means are provided for connecting the two sections 7a and 7b together at their meeting edges. One way of accomplishing this is to provide the short section 7b with depending fingers 20 at its inner edge which are adapted to engage sockets 21 formed in the inner edge 22 of the longer section 7a.

If it is desired that the play pen compartment should extend from one side to the other of the automobile, then the two platform sections 7a and 7b will be connected together and installed in the manner of the platform element 7 in Figs. 1 and 8. On the other hand, if it is necessary or desirable to provide room on the rear seat to accommodate one passenger, then the smaller platform section 7b will be removed and the longer platform section 7a will be installed in the automobile as above described. The length of the platform section 7a is such that when so installed the legs 10a at the inner end thereof will be located closely adjacent the raised portion 17 of the automobile floor 18, and there will be sufficient space beyond the inner end of the platform section 7a for a passenger to occupy the end of the rear seat.

Where the platform section 7a only is used, we prefer to employ in connection therewith an end member 23 which forms the inner end of the play pen compartment. This end member has a width preferably corresponding to that of the platform sections and is provided with two depending fingers 24 adapted to be removably received in the sockets 21 as shown in Fig. 9. With this construction the end member may be removed if its presence is not necessary.

In Fig. 7 we have shown a somewhat different embodiment of the invention in which the platform element indicated at 7c is provided at each end with two sets of legs, a set of long legs 25 and a set of short legs 26. The long legs 25 are hinged to the under side of the platform element and may be folded up thereagainst as shown at the right, Fig. 7, and when so folded, the short legs 26 may be used to support the platform element in its lowered stored position as shown in Fig. 6.

The longer pivoted legs 25 are connected to the under side of the platform by suitable hinges 27 and are held in their operative position by folding braces 28 of any usual construction, said braces being adapted to fold as the longer legs 25 are swung from their operative to their folded positions.

The compartment provided by the use of the platform element is large enough so that an adult may comfortably recline in it by lying diagonally thereacross, or if one section only of the platform element is used, a person occupying the end of the back seat may use said platform section as a rest for his feet.

The compartment provided by the use of the platform element has a substantially level floor, and if its use as a play pen compartment is not necessary, it can conveniently be used as a place to store luggage. The level floor of the compartment makes a level area of a size to receive large pieces of luggage.

In one section only of the platform element is used, thereby providing a space for a passenger on the rear seat, such passenger may, if desired, use the platform section as a foot and leg rest whereby such passenger may assume a semi-inclined position which may be restful during a long automobile journey.

The platform element, as stated above, is removable from the automobile and when so removed, it may be used as a table for various purposes, such for instance, as a table for use at picnics, or for any other desired use where a table outside of the automobile is required.

We claim:
1. An automobile accessory for an automobile of the sedan type, said accessory comprising a portable platform element of a width to fit between the seat cushion of the back seat of said automobile and the back of the front seat and of a length to extend from one side to the other of the automobile body, said platform element being divided transversely nearer one end than the other to provide a long section and a short section which are separable from each other, means to support said long section at a level substantially flush with the top surface of the rear seat cushion, said short section having at its outer end legs to support said outer end at the same level as the long section and means at the meeting ends of the two sections to detachably support the inner end of the short section on the long section, said two sections when assembled forming with the back seat cushion a substantially level floor of a play compartment for children, the front and back walls of which are constituted by the backs of the front and back seats, the removal of the short section providing a play compartment of reduced size and also providing a space for a passenger at the end of the rear seat.

2. An automobile accessory for an automobile of the sedan type, said accessory comprising a portable platform element of a width to fit between the seat cushion of the back seat of said automobile and the back of the front seat and of a length to extend from one side to the other of the automobile body, said platform element being divided transversely nearer one end than the other to provide a long section and a short section which are separate from each other, means to support said long section in an operative position independently of the short section and at a level substantially flush with the top surface of the rear seat cushion, said short section having at its outer end legs to support its outer end portion in operative position at the same level as the long section, and means at the meeting ends of the two sections to support the inner end of said short section on the adjacent end of the long section, and at the same level, said two sections when thus assembled forming with the back seat cushion a substantially level floor of a play compartment for children, the front and back walls of which are constituted by the backs of the front and back seats, said short section being movable from its operative position without modifying the supporting structure of the long section, thereby providing a play compartment of reduced size and also providing a passenger space at the end of the rear seat and between the inner end of the long section and the adjacent side wall of the automobile.

JOHN M. STIFF.
BERNARD G. E. STIFF.

REFERENCES CITED

The following references are of record in the file of this patent:

UNITED STATES PATENTS

| Number | Name | Date |
| --- | --- | --- |
| 1,062,898 | Drew | May 27, 1913 |
| 1,208,053 | Van Allen | Dec. 12, 1916 |
| 1,333,924 | Kay | Mar. 16, 1920 |
| 1,577,232 | Holly | Mar. 16, 1926 |
| 1,599,247 | Ridabock | Sept. 7, 1926 |
| 1,959,974 | Westgate | May 22, 1934 |
| 2,329,213 | Neutra et al. | Sept. 14, 1943 |

FOREIGN PATENTS

| Number | Country | Date |
| --- | --- | --- |
| 292,499 | Germany | June 15, 1916 |